(12) United States Patent
Feng et al.

(10) Patent No.: US 11,677,084 B1
(45) Date of Patent: Jun. 13, 2023

(54) SHELL REINFORCING STRUCTURE FOR FUEL CELL HUMIDIFIER

(71) Applicant: Shenzhen Extender Co., Ltd., Shenzhen (CN)

(72) Inventors: Yan Feng, Shenzhen (CN); Yiming Shi, Shenzhen (CN); Chao Liu, Shenzhen (CN); Zhaohui Wen, Shenzhen (CN)

(73) Assignee: Shenzhen Extender Co., Ltd., Shenzhen (CN)

( * ) Notice: Subject to any disclaimer, the term of this patent is extended or adjusted under 35 U.S.C. 154(b) by 0 days.

(21) Appl. No.: 17/746,390

(22) Filed: May 17, 2022

(51) Int. Cl.
*H01M 8/04119* (2016.01)
*H01M 8/02* (2016.01)

(52) U.S. Cl.
CPC ......... *H01M 8/04126* (2013.01); *H01M 8/02* (2013.01)

(58) Field of Classification Search
None
See application file for complete search history.

(56) References Cited

U.S. PATENT DOCUMENTS

| | | | |
|---|---|---|---|
| 2009/0039010 A1* | 2/2009 | Hayashi | B01D 65/00 156/65 |
| 2020/0330927 A1* | 10/2020 | An | B01D 63/04 |

\* cited by examiner

*Primary Examiner* — Haroon S. Sheikh
(74) *Attorney, Agent, or Firm* — HoustonHogle LLP

(57) ABSTRACT

A shell reinforcing structure for a fuel cell humidifier comprises a main body shell, fixed plates and grating mechanisms, wherein the side edges of the main body shell are fixedly connected with the fixed plates, the side edge of the fixed plate is provided with an end cover, the upper part of the end cover on the left side is fixedly connected with a dry air inlet tube, the left side of the upper part of the main body shell is fixedly connected with a moisture outlet tube, the right side of the upper part of the main body shell is fixedly connected with a moisture inlet tube, the upper end of the end cover on the right side is fixedly connected with a dry air outlet tube, fixed holes are formed in the side edge surface of the fixed plate.

5 Claims, 3 Drawing Sheets

SHELL REINFORCING STRUCTURE FOR FUEL CELL HUMIDIFIER

TECHNICAL FIELD

The present disclosure relates to the technical field of fuel cells, in particular to a shell reinforcing structure for a fuel cell humidifier.

BACKGROUND ART

The fuel cell is a chemical device for directly converting chemical energy of fuel into electric energy, and is also called an electrochemical generator. The fuel cell is the fourth power generation technology beyond hydroelectric power generation, thermal energy power generation and atomic energy power generation. Gibbs free energy in the chemical energy of fuel is partially converted into electric energy through the electrochemical reaction of the fuel cell, the fuel cell is not limited by the Carnot cycle effect, and therefore, the efficiency is high. In addition, the fuel cell uses fuel and oxygen as raw materials. Meanwhile, no mechanical transmission part is arranged, noise pollution is avoided, little harmful gas is emitted, and therefore, the fuel cell is the most promising power generation technology from the point of view of saving energy and protecting the ecological environment.

At present, a reinforcing rib framework is fixed to the outer surface of the main body of a shell reinforcing structure for a fuel cell humidifier, reinforcing ribs occupy large space, and the space, occupying the fuel cell system, of the humidifier is greatly reduced. Due to the fact that the reinforcing ribs cannot bear large pressure when receiving external force, the fuel cell humidifier and the fuel cell are damaged to cause potential safety hazards.

SUMMARY

The purpose of the present disclosure is to provide a shell reinforcing structure for a fuel cell humidifier so as to solve the problem proposed in the background art.

In order to achieve the above purpose, the present disclosure provides the following technical scheme.

A shell reinforcing structure for a fuel cell humidifier comprises a main body shell, fixed plates and grating mechanisms, wherein the side edges of the main body shell are fixedly connected with the fixed plates, the side edge of the fixed plate is provided with an end cover, the upper part of the end cover on the left side is fixedly connected with a dry air inlet tube, the left side of the upper part of the main body shell is fixedly connected with a moisture outlet tube, the right side of the upper part of the main body shell is fixedly connected with a moisture inlet tube, the upper end of the end cover on the right side is fixedly connected with a dry air outlet tube, fixed holes are formed in the side edge surface of the fixed plate, the inner wall of the main body shell is fixedly connected with hollow layers, the side edges of the hollow layer are fixedly connected with fixed buckles, the inner side of the hollow layer is fixedly connected with an inner layer shell, and the inner side of the inner layer shell is fixedly connected with a screen frame.

Preferably, mesh openings are formed in the surface of the screen frame, buckle grooves are clamped in the surface of the screen frame, and the interior of the screen frame is fixedly connected with the grating mechanism.

Preferably, the grating mechanism comprises gratings, buckles and membrane tubes, the side edge ports of the grating are fixedly connected with the buckles, and the inner side of the grating is fixedly connected with the membrane tube.

Preferably, the number of the fixed plates and the number of the end covers are two, the bottom of the end cover is rotatably connected with the lower end of the fixed plate, and the side edges of the fixed plate are fixedly connected with the outer side of the main body shell.

Preferably, fixed holes are formed in the surface of the fixed plate and the surface of the hollow layer.

Compared with the prior art, the present disclosure has the following beneficial effects.

Firstly, in the shell reinforcing structure, through the arranged main body shell, end covers and fixing plates, reinforcing ribs do not need to be additionally arranged on the surface of the shell, and the space, occupying the fuel cell system, of the humidifier can be reduced; due to the fact that large pressure is reduced in the occupied space of the reinforcing ribs, the main body shell can bear the pressure resistance of the shell; the main body shell can be fixed through the fixed plates; and the end covers can be rotatably opened and closed on the fixed plates, so that the fuel cell is convenient to maintain.

Secondly, in the shell reinforcing structure, through the arranged gratings, buckles and membrane tubes, the shell can be pulled by additionally arranging the gratings in the shell, so that the pressure resistance of the shell is greatly enhanced; each grating is filled with membrane tubes, so that the pressure resistance of the gratings and the shell can be enhanced; when the gratings in the main body shell are subjected to injection molding and are pressurized from the inside, the gratings can be used for pulling the shell, so that the shell can bear relatively large pressure; and therefore, the main body shell does not need to be additionally provided with reinforcing ribs, so that the pressure resistance of the shell is improved through the gratings.

Reference signs: 1, main body shell; 2, fixed plate; 3, end cover; 4, dry air inlet tube; 5, moisture outlet tube; 6, moisture inlet tube; 7, dry air outlet tube; 8, fixed hole; 9, grating mechanism; 901, grating; 902, buckle; 903, membrane tube; 10, fixed buckle; 11, inner layer shell; 12, buckle groove; 13, hollow layer; 14, screen frame; and 15, mesh opening.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

Figure 1:
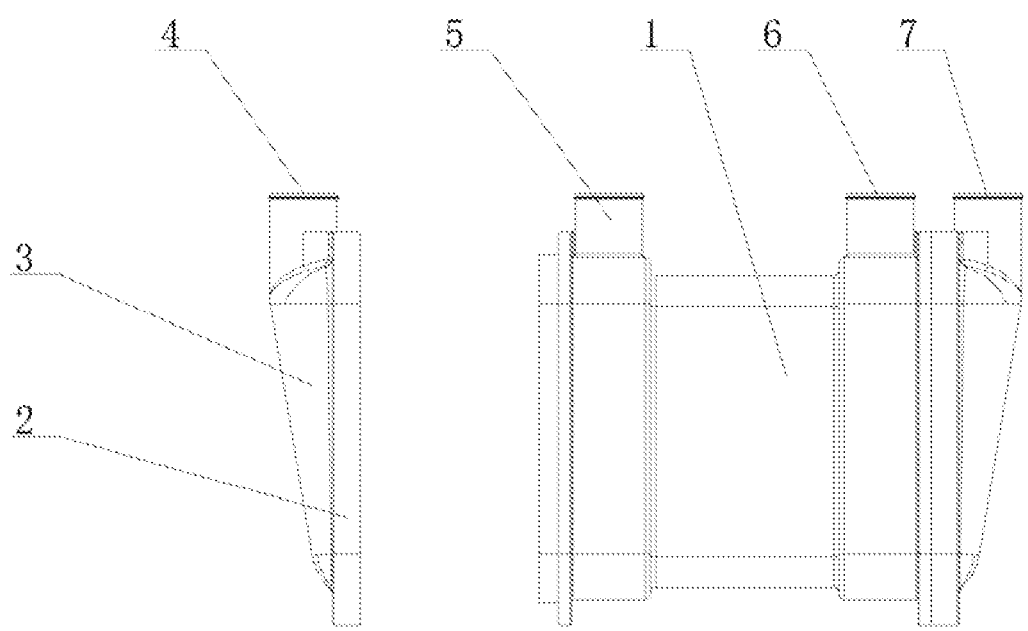
FIG. 1 is an integral structural schematic diagram of the present disclosure.
Figure 2:
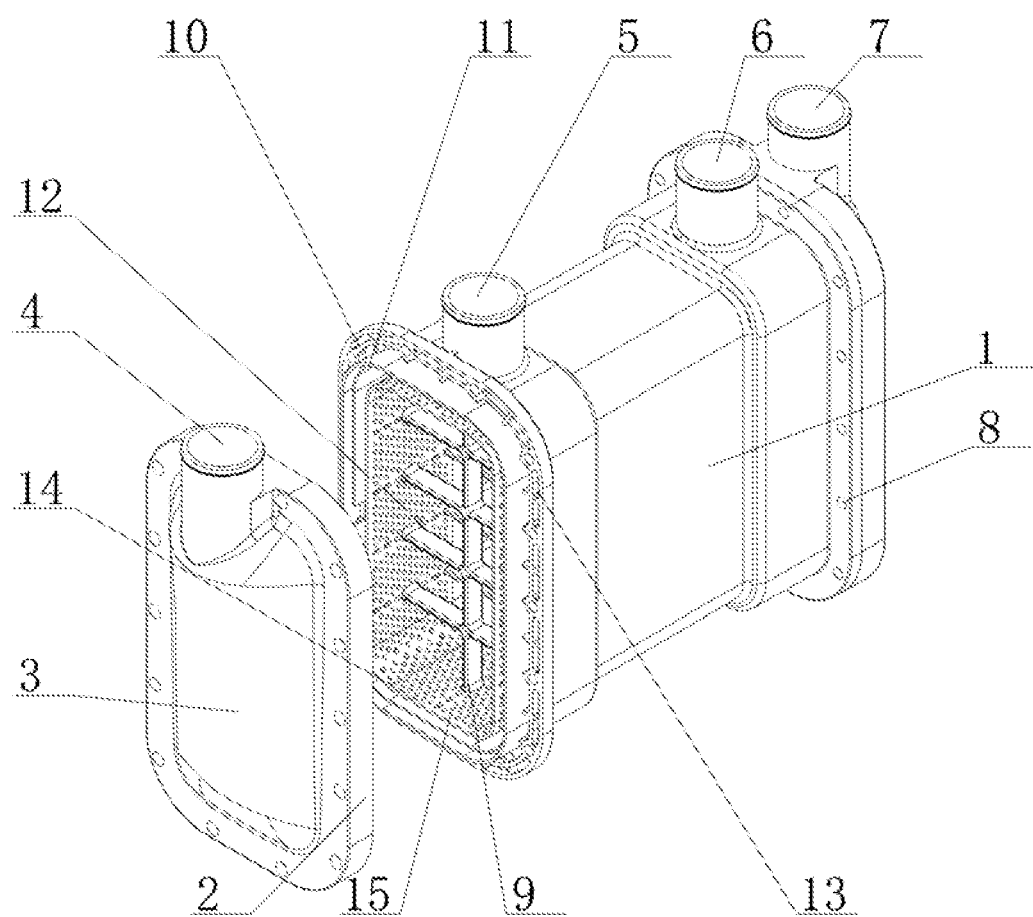
FIG. 2 is a side view of an integral structure of the present disclosure.
Figure 3:
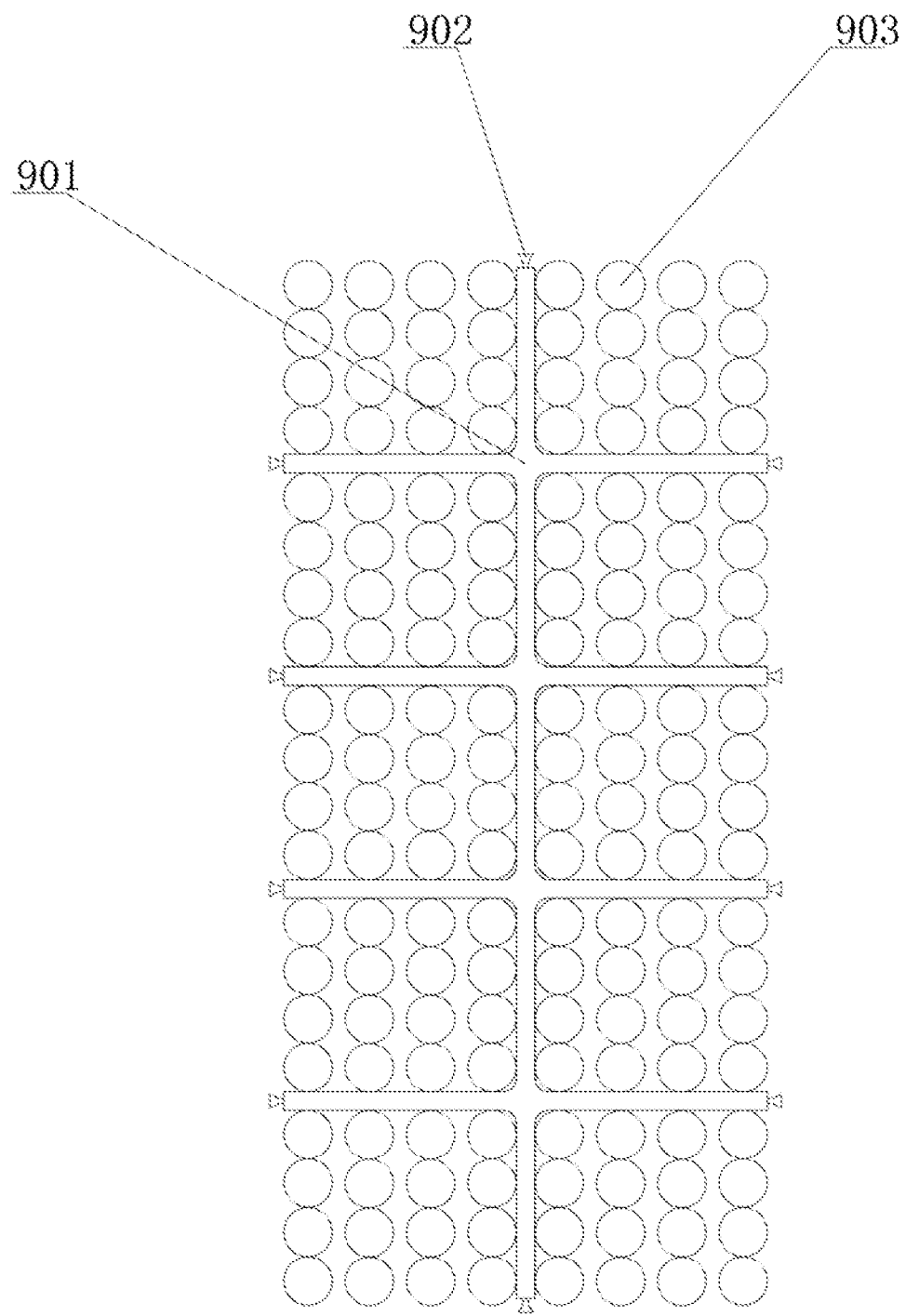
FIG. 3 is a schematic diagram of a grating mechanism in the present disclosure.

Referring to FIG. 1 to FIG. 3, the present disclosure provides the following technical scheme.

A shell reinforcing structure for a fuel cell humidifier comprises a main body shell 1, fixed plates 2 and grating mechanisms 9, wherein the side edges of the main body shell 1 are fixedly connected with the fixed plates 2, the side edge of the fixed plate 2 is provided with an end cover 3, the upper part of the end cover 3 on the left side is fixedly connected with a dry air inlet tube 4, the left side of the upper part of the main body shell 1 is fixedly connected with a moisture outlet tube 5, the right side of the upper part of the main body shell 1 is fixedly connected with a moisture inlet tube 6, the upper end of the end cover 3 on the right side is fixedly connected with a dry air outlet tube 7, fixed holes 8 are formed in the side edge surface of the fixed plate 2, the inner wall of the main body shell 1 is fixedly connected with hollow layers 13, the side edges of the hollow layer 13 are fixedly connected with fixed buckles 10, the inner side of the hollow layer 13 is fixedly connected with an inner layer shell 11, and the inner side of the inner layer shell 11 is fixedly connected with a screen frame 14.

Mesh openings 15 are formed in the surface of the screen frame 14, buckle grooves 12 are clamped in the surface of the screen frame 14, and the interior of the screen frame 14 is fixedly connected with the grating mechanism 9. The screen frame 14 is provided with a corresponding opening, and the screen frame and the main body shell 1 can be combined together by pressing down the screen frame and clamping the screen frame. The grating mechanism 9 comprises gratings 901, buckles 902 and membrane tubes 903, the side edge ports of the grating 901 are fixedly connected with the buckles 902, and the inner side of the grating 901 is fixedly connected with the membrane tube 903. The membrane tube 903 can be fixed through the grating 901. The membrane tubes 903 can be arranged in the grating 901 of the screen frame 14 in a bundle mode. The gratings 901 in the main body shell 1 can be pulled to the shell through the gratings 901, so that the pressure resistance of the main body shell 1 is greatly improved. Due to the fact that the strength of the reinforcing ribs is too poor, large pressure cannot be borne and the reinforcing ribs occupy large space. Therefore, reinforcing ribs do not need to be additionally arranged on the surface of the main body shell 1, and the system space of the humidifier for unfolding the fuel cell can be reduced. The number of the fixed plates 2 and the number of the end covers 3 are two, the bottom of the end cover 3 is rotatably connected with the lower end of the fixed plate 2, and the side edges of the fixed plate 2 are fixedly connected with the outer side of the main body shell 1. Through the fixed holes 8 formed in the fixed plate 2, the mesh openings 8 formed in the side edge surface of the main body shell 1, the fixed buckles 10 are arranged in the hollow layer 13 on the side edge of the main body shell 1, the fixed plate and the main body shell can be clamped together, and the main body shell 1 and the fixed plate 2 are conveniently fixed through fixed bolts. Moreover, a rotating shaft is arranged on the outer side of the bottom of the fixed plate 2, and the end cover 3 is rotatably connected through the rotating shaft, so that the end cover 3 can be fixed to the fixed plate 2. When the fuel cell and the fuel cell humidifier need to be maintained and overhauled, the end cover can be conveniently opened to maintain and overhaul the fuel cell and the fuel cell, so that the practicability of the device is greatly improved, and convenience is brought to the device. Fixed holes 8 are formed in the surface of the fixed plate 2 and the surface of the hollow layer 13. Mesh openings are formed in the surface of the fixed plate 2 and the surface of the hollow layer 13, so that the main body shell 1 and the fixed plate 2 are convenient to detach. Moreover, reinforcing ribs do not need to be additionally arranged on the main body shell 1, the main body shell 1 occupies large space with the reinforcing ribs, and the reinforcing ribs cannot bear large pressure. When the fuel cell humidifier is seriously impacted, safety factors may be caused to the fuel cell. Therefore, when the grating mechanism 9 in the main body shell 1 is subjected to injection molding and is pressurized from the outside, the gratings 901 can be used for pulling the shell, so that the main body shell 1 can bear relatively large pressure. The main body shell does not need to be additionally provided with reinforcing ribs, so that the safety and the stability of the device are improved.

The working process is as follows: when the device is used, the fixed plate 2 and the main body shell 1 of the device can be fixed through fixed bolts; the fixed buckle 10 arranged on the hollow layer on the inner side of the main body shell 1 can be used for pre-fixing the fixed plate 2 and the main body shell 1; errors of the main body shell 1 and the fixed plate 2 are prevented; the end cover 3 on the side edge of the fixed plate 2 can be rotatably opened; the fuel cell humidifier and the fuel cell can be conveniently overhauled, so that the safety of the device is improved; the dry air inlet tube 4 above the fixed plate 2 on the left side can filter water vapor in the air, and the water vapor is introduced into the fuel cell humidifier and then is discharged through the dry air outlet tube 7 on fixed plate 2 on the right side; the impact force of airflow on the membrane tube 903 can be reduced through the moisture inlet tube 6 on the main body shell 1, so that the service life of the membrane tube can be prolonged, the airflow can flow uniformly, and the performance of the humidifier can be improved; the moisture outlet tube 5 on the left side of the main body shell 1 can discharge moisture; the grating mechanism can be fixed through the screen frame 14 in the main body shell 1; the buckles are arranged on the screen frame 14; the screen frame 14 and the main body shell 1 can be combined together; the membrane tubes 903 can be arranged in the grating 901 of the screen frames 14 in a bundle mode through the grating mechanism 9; the main body shell 1 is pulled by additionally arranging the gratings 901 in the main body shell 1, so that the pressure resistance of the main body shell 1 can be greatly enhanced; each grating 901 can be filled with the membrane tubes 903; and therefore, reinforcing ribs do not need to be additionally arranged outside the main body shell 1, the space of the humidifier for a fuel cell system can be reduced, the main body shell can bear larger pressure, and the safety and the stability of the device are improved.

Although the embodiments of the present disclosure have already been illustrated and described, various changes, modifications, replacements and transformations can be made by those skilled in the art under the condition of without departing from the principle and the spirit of the present disclosure, and thus the scope of the present disclosure should be restricted by claims and equivalents thereof.

What is claimed is:

1. A shell reinforcing structure for a fuel cell humidifier, comprising a main body shell (1), fixed plates (2) and grating mechanisms (9), wherein the side edges of the main body shell (1) are fixedly connected with the fixed plates (2), the side edge of the fixed plate (2) is provided with an end cover (3), the upper part of the end cover (3) on the left side is fixedly connected with a dry air inlet tube (4), the left side of the upper part of the main body shell (1) is fixedly connected with a moisture outlet tube (5), the right side of the upper part of the main body shell (1) is fixedly connected with a moisture inlet tube (6), the upper end of the end cover (3) on the right side is fixedly connected with a dry air outlet tube (7), fixed holes (8) are formed in the side edge surface of the fixed plate (2), the inner wall of the main body shell (1) is fixedly connected with hollow layers (13), the side edges of the hollow layer (13) are fixedly connected with fixed buckles (10), the inner side of the hollow layer (13) is fixedly connected with an inner layer shell (11), and the inner side of the inner layer shell (11) is fixedly connected with a screen frame (14).

2. The shell reinforcing structure for a fuel cell humidifier according to claim 1, wherein mesh openings (15) are formed in the surface of the screen frame (14), buckle grooves (12) are clamped in the surface of the screen frame (14), and the interior of the screen frame (14) is fixedly connected with the grating mechanism (9).

3. The shell reinforcing structure for a fuel cell humidifier according to claim 2, wherein the grating mechanism (9) comprises gratings (901), buckles (902) and membrane tubes (903), the side edge ports of the grating (901) are fixedly connected with the buckles (902), and the inner side of the grating (901) is fixedly connected with the membrane tube (903).

4. The shell reinforcing structure for a fuel cell humidifier according to claim 1, wherein the number of the fixed plates (2) and the number of the end covers (3) are two, the bottom of the end cover (3) is rotatably connected with the lower end of the fixed plate (2), the side edges of the fixed plate (2) are fixedly connected with the outer side of the main body shell (1), and the inner side and the outer side of the end cover (3) are both of a cambered surface structure.

5. The shell reinforcing structure for a fuel cell humidifier according to claim 1, wherein fixed holes (8) are formed in the surface of the fixed plate (2) and the surface of the hollow layer (13).

* * * * *